J. E. & H. L. CAMPBELL.
COTTON CHOPPER.
APPLICATION FILED MAY 24, 1910.
968,831.
Patented Aug. 30, 1910.
2 SHEETS—SHEET 1.
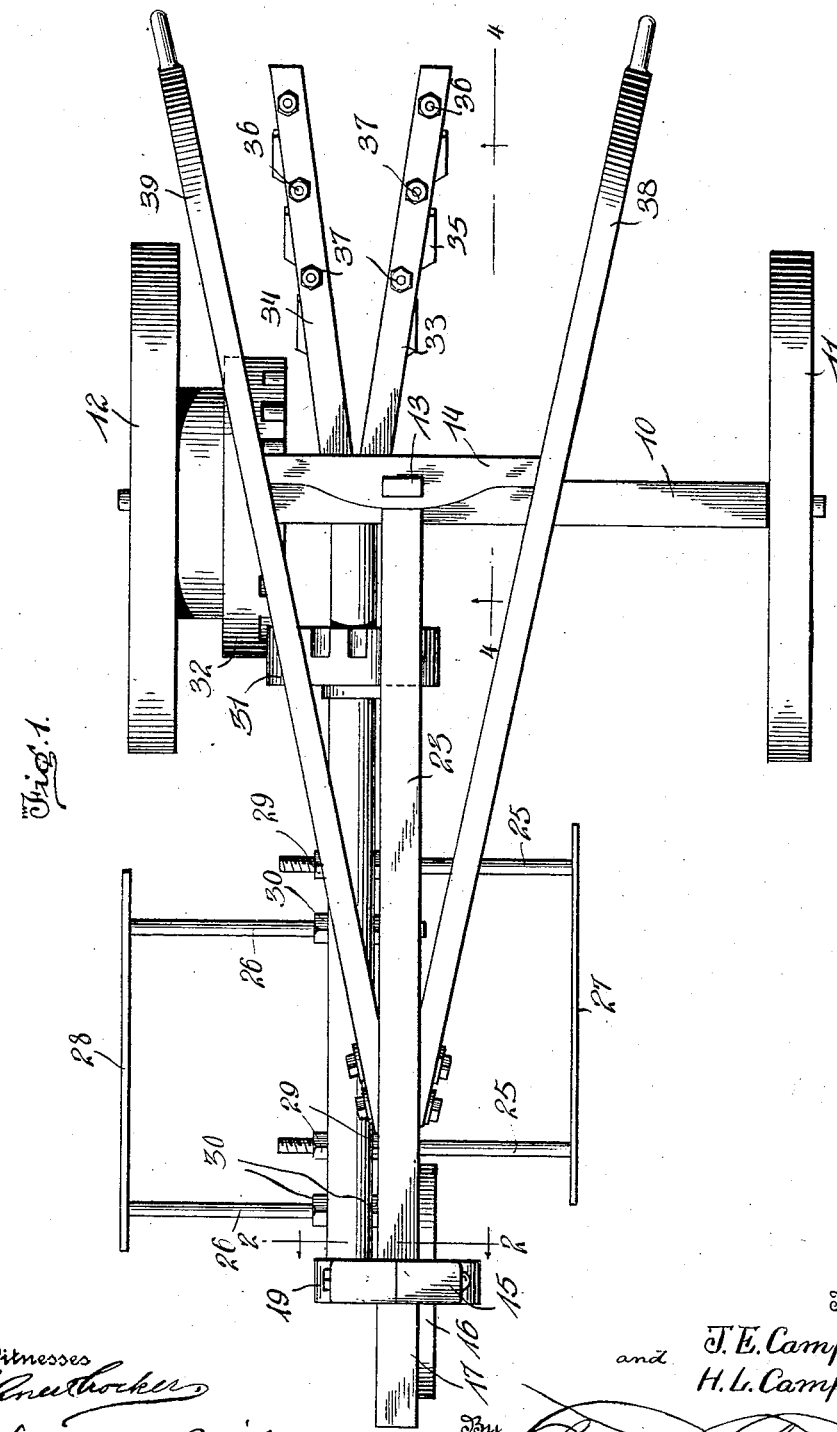
Witnesses
Inventors
J. E. Campbell,
and H. L. Campbell.
By
Attorneys

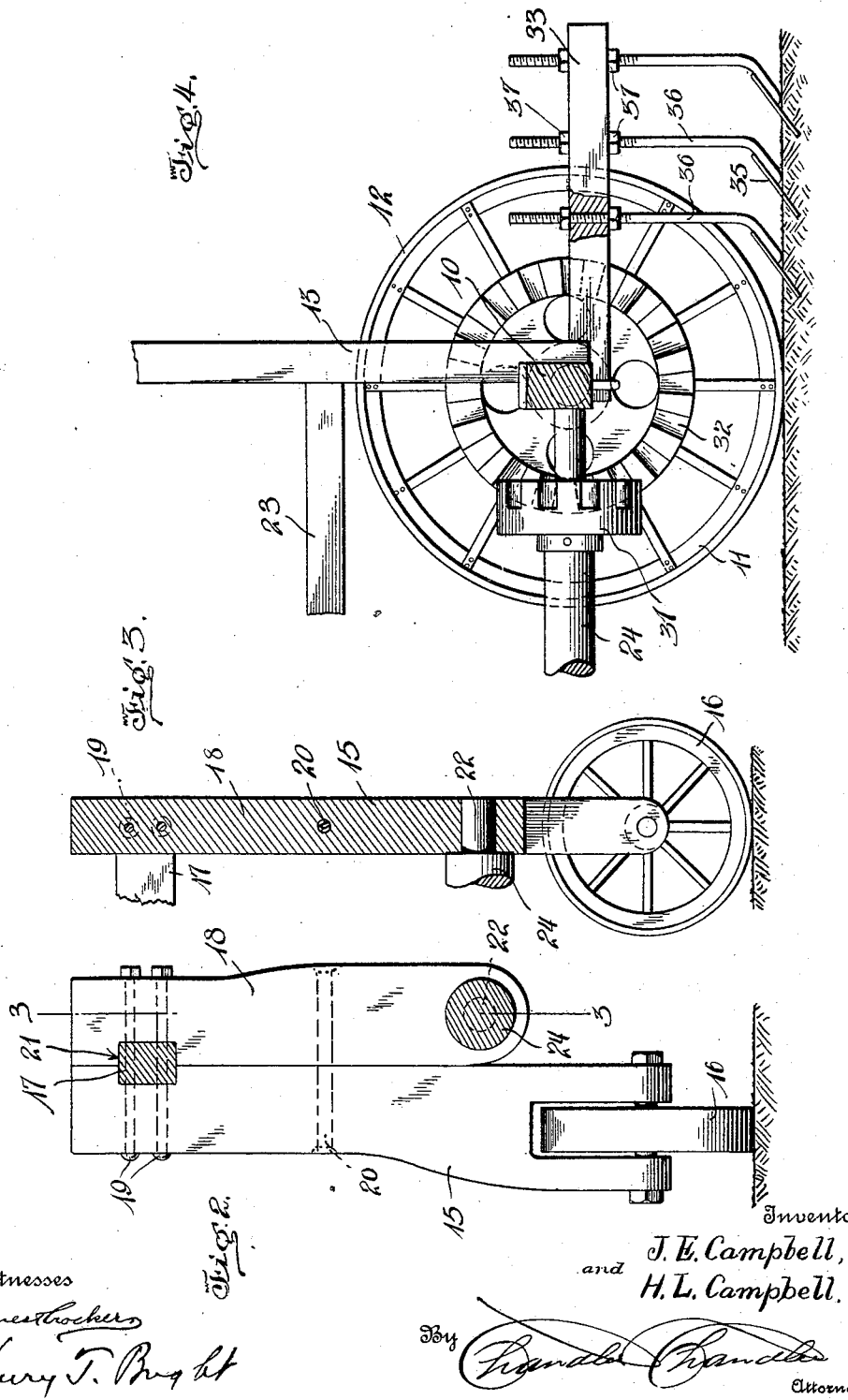

UNITED STATES PATENT OFFICE.

JOHN E. CAMPBELL AND HANES L. CAMPBELL, OF WHITEVILLE, NORTH CAROLINA.

COTTON-CHOPPER.

968,831.    Specification of Letters Patent.    Patented Aug. 30, 1910.

Application filed May 24, 1910. Serial No. 563,208.

*To all whom it may concern:*

Be it known that we, JOHN E. CAMPBELL and HANES L. CAMPBELL, citizens of the United States, residing at Whiteville, in the county of Columbus, State of North Carolina, have invented certain new and useful Improvements in Cotton-Choppers; and we do hereby declare the following to be a full, clear, and exact description of the invention, such as will enable others skilled in the art to which it appertains to make and use the same.

This invention relates to cotton choppers.

The object of the invention resides in the production of a cotton chopper including a traction operated rotatable shaft provided with chopping blades, said shaft being so supported that it may be easily and readily detached from the device and permit the remaining portions to be utilized with efficiency as a cultivator.

To this end the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views; and in which, Figure 1 is a plan view of a cotton chopper constructed in accordance with the invention; Fig. 2, a section on the line 2—2 of Fig. 1; Fig. 3, a section on the line 3—3 of Fig. 2; and, Fig. 4, a section on the line 4—4 of Fig. 1.

Referring to the drawings, the invention is shown as comprising an axle 10 having rotatably mounted on each end traction wheels 11 and 12. Rising from the axle 10 is a standard 13 provided at its upper end with a cross bar 14. Disposed forwardly of the axle 10 and the standard 13 is an upright 15 having a bifurcated lower end between the arms of which is journaled a guide wheel 16. Said upright 15 is provided at its upper end on one side with a recess 17 for a purpose that will presently appear. A journal plate 18 is detachably secured against the recessed side of the upright 15 by means of bolts 19 and 20 passing transversely through said upright and journal plate. A recess 21 corresponding to the recess 17 is formed in the inner side of the journal plate 18 so as to register with the recess 17 when said upright and journal plate are secured together. Formed in the lower end of the plate 18 is an opening 22 for a purpose to be hereinafter referred to. A beam 23 has one end mounted in the standard 13 and the other end disposed in the recesses 17 and 21 and is secured against longitudinal movement in said recesses by means of a bolt 19 which passes through said beam.

A shaft 24 has one end detachably and rotatably mounted in the opening 22 of the journal plate 18 and the other end detachably and rotatably mounted in the axle 10. Adjustably mounted in spaced transverse openings in the shaft 24 are arms 25 and 26 connected together at their outer ends by chopping blades 27 and 28 respectively. Said arms 25 and 26 are threaded throughout a portion of their extent and have mounted on said threaded portion nuts 29 and 30 disposed on opposite sides of the shaft 24 so that the arms 25 and 26 may be adjusted longitudinally and the chopping blades 27 and 28 held in any desired position. A gear 31 is fixed on the shaft 24 and meshes with a gear 32 fixed to the wheel 12 whereby the rotation of said wheel 12 will effect a rotation of the shaft 24 and the proper actuation of the chopping blades 27 and 28.

Extending rearwardly from and supported by the axle 10 are diverging beams 33 and 34 which support a plurality of cultivator plows 35. Said plows 35 are each provided with a shank 36 having threaded upper ends projecting through suitable openings in the beams 33 and 34. Nuts 37 are mounted on the threaded shanks of each plow and are disposed on opposite sides of the beams 33 and 34 respectively, whereby said shanks may be adjusted vertically as conditions demand.

From the foregoing description it will be apparent that should it be desired to utilize the device as a cultivator it will be only necessary to detach the journal plate 18 from the upright 15 by removing the bolts 19 and 20 when the shaft 24 and the chopping blades carried thereby can be entirely disassociated with the machine leaving only the cultivator plows 35 for use. After the shaft 24 has been detached the journal plate 18 is again secured to the upright 15 in order to properly hold the beam 23 in place.

The machine is adapted to be operated by means of a draft animal attached thereto in any suitable manner and is manually controlled by means of handles 38 and 39 secured to the beam 23 and the cross arm 14.

What is claimed is:

In a cotton chopper, the combination of a wheel axle, a standard rising from said axle, a wheel supported upright spaced forward of the axle and standard and having a recess in one side thereof, a beam having one end secured to the standard and the other end disposed in said recess, a journal plate detachably secured to the wheel supported upright against the recessed side thereof and confining the beam against lateral displacement from the recess, a shaft having one end detachably and rotatably supported in said journal plate and the other end detachably and rotatably supported in said axle, adjustable chopping blades carried by said shaft, a gear mounted on said shaft, a gear secured to one of the wheels of the axle and meshing with the gear on the shaft, a pair of rearwardly diverging beams carried by the axle in longitudinal alinement with the shaft, and a plurality of adjustable cultivator plows carried by said beam.

In testimony whereof, we affix our signatures, in presence of two witnesses.

JOHN E. CAMPBELL.
HANES L. CAMPBELL.

Witnesses:
W. R. OLDHAM,
G. R. MAULTSBY.